United States Patent
Li et al.

(10) Patent No.: US 11,645,537 B2
(45) Date of Patent: May 9, 2023

(54) NEURAL NETWORK TRAINING METHOD, NEURAL NETWORK TRAINING APPARATUS AND ELECTRONIC DEVICE

(71) Applicant: Beijing Horizon Robotics Technology Research and Development Co., Ltd., Beijing (CN)

(72) Inventors: Zhichao Li, Beijing (CN); Yushu Gao, Beijing (CN); Yifeng Geng, Beijing (CN); Heng Luo, Beijing (CN)

(73) Assignee: Beijing Horizon Robotics Technology Research and Development Co., Ltd., Beijing (CN)

( * ) Notice: Subject to any disclaimer, the term of this patent is extended or adjusted under 35 U.S.C. 154(b) by 526 days.

(21) Appl. No.: 16/746,887

(22) Filed: Jan. 19, 2020

(65) Prior Publication Data

US 2020/0250542 A1 Aug. 6, 2020

(30) Foreign Application Priority Data

Feb. 2, 2019 (CN) .......................... 201910107645.8

(51) Int. Cl.
*G06N 20/20* (2019.01)
*G06N 3/084* (2023.01)
*G06N 3/045* (2023.01)

(52) U.S. Cl.
CPC ............. *G06N 3/084* (2013.01); *G06N 3/045* (2023.01); *G06N 20/20* (2019.01)

(58) Field of Classification Search
USPC ........................................................ 706/25
See application file for complete search history.

(56) References Cited

U.S. PATENT DOCUMENTS

| 10,127,659 | B2 | 11/2018 | Hsieh et al. | |
| 2016/0321540 | A1* | 11/2016 | Towal | G06N 3/08 |
| 2020/0250542 | A1* | 8/2020 | Li | G06N 20/20 |

FOREIGN PATENT DOCUMENTS

| CN | 104346629 A | 2/2015 |
| CN | 104866900 A | 8/2015 |
| CN | 107633293 A | 1/2018 |
| CN | 107689224 A | 2/2018 |

(Continued)

OTHER PUBLICATIONS

First Office Action in counterpart Chinese Patent Application No. 201910107645.8, dated Nov. 11, 2019.

(Continued)

*Primary Examiner* — Tyler D Paige
(74) *Attorney, Agent, or Firm* — Westbridge IP LLC

(57) ABSTRACT

Disclosed are a neural network training method, a neural network training device and an electronic device. The neural network training method includes: training a first neural network to be trained by using sample data; determining an indicator parameter of the first neural network in a current training process; determining an update manner corresponding to a preset condition if the indicator parameter meets the preset condition; and updating a parameter of a batch normalization layer in the first neural network based on the update manner. In this way, sparsing of a feature map output by a neural network is implemented, thereby reducing an amount of data to be transmitted and improving computation speed of a chip.

20 Claims, 8 Drawing Sheets

(56) References Cited

FOREIGN PATENT DOCUMENTS

| CN | 108171329 A | 6/2018 |
|---|---|---|
| CN | 108510456 A | 9/2018 |
| CN | 108875601 A | 11/2018 |
| CN | 109102073 A | 12/2018 |

OTHER PUBLICATIONS

Second Office Action in counterpart Chinese Patent Application No. 201910107645.8, dated Mar. 2, 2020.

* cited by examiner

NEURAL NETWORK TRAINING METHOD, NEURAL NETWORK TRAINING APPARATUS AND ELECTRONIC DEVICE

CROSS-REFERENCE TO RELATED APPLICATION

This application claims the priority to Chinese Patent Application No. 201910107645.8, filed on Feb. 2, 2019, the entire contents of which are incorporated herein by reference for all purposes.

TECHNICAL FIELD

The present application relates to the field of deep learning, and more specifically, to a neural network training method, a neural network training apparatus, and an electronic device.

BACKGROUND

At present, with the rapid development of artificial intelligence technologies, it is expected to provide more and more artificial intelligence services, such as digital assistant and real-time translation, by using a terminal such as a smartphone. Therefore, there is a growing demand for a high-performance chip that may be used for neural network computation.

In practical application, there are two critical bottlenecks in computation performance of a chip. One is computation speed, and the other is a delay of data transmission. In order to improve the computation speed, methods of increasing a quantity of computation units, improving dominant frequency and the like may be used. In order to reduce the delay of data transmission, bandwidth may be increased or an amount of data to be transmitted may be reduced.

Therefore, in order to meet the demand of the high-performance chip, on the one hand, it is expected to improve hardware performance, including performance and transmission bandwidth of the chip itself; on the other hand, it is also expected to reduce the amount of data to be transmitted through optimization of the neural network.

Therefore, an improved neural network training method that can reduce the amount of data to be transmitted to improve the computation speed of the chip is required.

SUMMARY

To resolve the foregoing technical problems, the present application is proposed. Embodiments of the present application provide a neural network training method, a neural network training apparatus, and an electronic device, which can implement sparsing of a feature map output by a neural network, so as to reduce an amount of data to be transmitted and improve computation speed of a chip.

According to an aspect of the present application, a neural network training method is provided, including: training a first neural network to be trained by using sample data; determining an indicator parameter of the first neural network in a current training process; determining an update manner corresponding to a preset condition if the indicator parameter meets the preset condition; and updating a parameter of a batch normalization layer in the first neural network based on the update manner.

According to another aspect of the present application, a neural network training apparatus is provided, including: a network training unit, configured to train a first neural network to be trained by using sample data; a parameter determining unit, configured to determine an indicator parameter of the first neural network, in a current training process, trained by the network training unit; an update determining unit, configured to determine an update manner corresponding to a preset condition if the indicator parameter determined by the parameter determining unit meets the preset condition; and a parameter update unit, configured to update a parameter of a batch normalization layer in the first neural network based on the update manner determined by the update determining unit.

According to still another aspect of the present application, an electronic device is provided, including: a processor; and a memory, where the memory stores a computer program instruction, and when the computer program instruction is run by the processor, the processor is enabled to perform the neural network training method described above.

According to yet another aspect, a computer-readable media is provided, and the computer-readable media stores a computer program instruction. When the computer program instruction is run by the processor, the processor is enabled to perform the neural network training method described above.

According to the neural network training method, the neural network training apparatus, and the electronic device provided in the present application, whether the indicator parameter of the neural network in the training process meets the preset condition can be determined, and then the parameter of the batch normalization layer is updated in the update manner corresponding to the preset condition, so as to adjust an input condition of an activation function by updating the parameter of the batch normalization layer, to increase a quantity of zero elements in the feature map output by the neural network and implement sparsing of the feature map output by the neural network.

The sparsing of the feature map can increase a compression ratio of data in the neural network, reduce the amount of data to be transmitted, and then reduce a delay of data transmission and a quantity of transmissions. Therefore, smaller on-chip storage can be used to reduce costs by reducing the amount of data to be transmitted. Furthermore, the computation speed of the chip can be greatly accelerated by reducing the delay of data transmission and the quantity of transmissions.

BRIEF DESCRIPTION OF DRAWINGS

The foregoing and other objectives, features and advantages of the present application become more apparent by describing embodiments of the present application in more detail with reference to the accompanying drawings. The accompanying drawings are used to provide a further understanding of the embodiments of the present application and constitute a part of the specification. The accompanying drawings are used together with the embodiments of the present application to explain the present application and do not constitute any limitation on the present application. In the accompanying drawings, same reference numerals generally represent the same parts or steps.

DETAILED DESCRIPTION OF THE EMBODIMENTS

Figure 1:
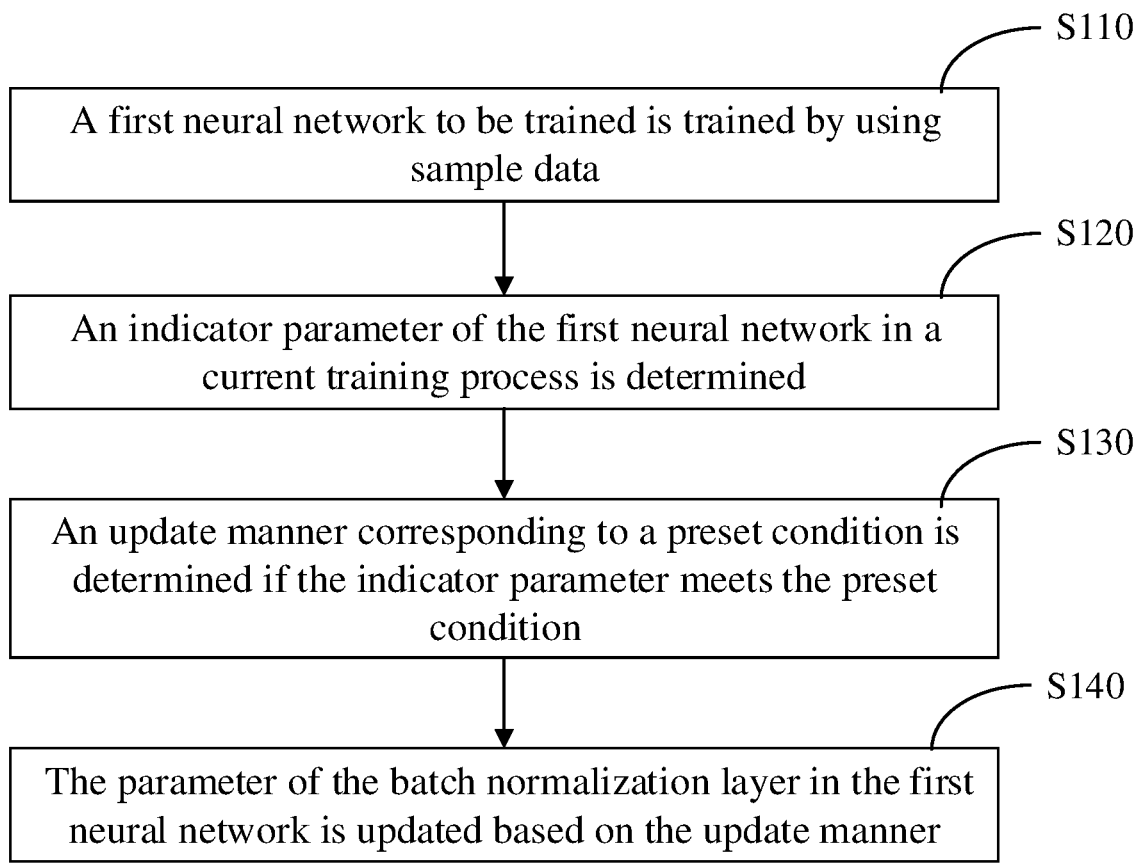
FIG. 1 is a flowchart of a neural network training method according to an embodiment of the present application.

Exemplary embodiments according to the present application will be described in detail below with reference to the accompanying drawings. Apparently, the described embodiments are only a part of the embodiments of the present application, not all the embodiments of the present application. It should be understood that the present application is not limited to the exemplary embodiments described herein.

Application Overview

As mentioned above, computation speed of a chip can be improved by reducing an amount of data to be transmitted. For example, the amount of data to be transmitted can be reduced by increasing on-chip storage and reducing a quantity of transmissions. However, the on-chip storage has high costs, and increasing the on-chip storage also causes larger complexity of hardware design.

In view of the foregoing technical problems, inventors of the present application find that a data amount of a feature map is significantly higher than that of a model parameter in a convolutional neural network. Therefore, the amount of data to be transmitted can be reduced by sparsing the feature map and increasing a compression ratio of data, and then a delay of data transmission and the quantity of transmissions are reduced, thereby greatly improving the overall computation speed of the chip.

In view of the foregoing technical problems, a basic concept of the present application is to determine whether an indicator parameter of a neural network in a training process meets a preset condition, and then update a parameter of a batch normalization layer in an update manner corresponding to the preset condition, so as to implement sparsing of a feature map output by the neural network.

Specifically, according to a neural network training method, a neural network training apparatus, and an electronic device in the present application, first a first neural network to be trained is trained by using sample data; then an indicator parameter of the first neural network in a current training process is determined; after that an update manner corresponding to a preset condition is determined if the indicator parameter meets the preset condition; and finally a parameter of a batch normalization layer in the first neural network is updated based on the update manner.

In this way, according to the neural network training method, the neural network training apparatus and the electronic device in the present application, an input condition of an activation function can be adjusted by updating the parameter of the batch normalization layer, so as to increase a quantity of zero elements in the feature map output by the neural network and implement sparsing of the feature map output by the neural network.

Sparsing of the feature map can increase the compression ratio of the data of the neural network, reduce the amount of data to be transmitted, and then reduce the delay of data transmission and the quantity of transmissions between a multiplier/accumulator (MAC) and a storage unit (for example, an SRAM). Therefore, smaller on-chip storage can be used to reduce costs by reducing the amount of data to be transmitted. Furthermore, the computation speed of the chip can be greatly accelerated by reducing the delay of data transmission and the quantity of transmissions.

After the basic principle of the present application is introduced, various non-limiting embodiments of the present application are specifically described with reference to the accompanying drawings.

Exemplary Methods

FIG. 1 is a flowchart of a neural network training method according to an embodiment of the present application.

As shown in FIG. 1, the neural network training method according to this embodiment of the present application includes the following steps.

In step S110, a first neural network to be trained is trained by using sample data. Herein the first neural network to be trained may be various types of neural networks, for example, a convolutional neural network, and may be used for tasks such as image recognition. For example, the first neural network to be trained may be applied to a self-driving scenario, to identify a pedestrian or another object in an image. Accordingly, in the self-driving scenario, the sample data is an image set including a street scenario and the like, and the first neural network is configured to perform training by using the image set, to identify a pedestrian, vehicle, lane, traffic sign and the like in the street scenario.

In step S120, an indicator parameter of the first neural network in a current training process is determined. As described above, an objective of the neural network training method according to this embodiment of the present application is to implement sparsing of the feature map output by the first neural network by updating the parameter of the batch normalization layer, that is, to increase a quantity of zero elements in the feature map. However, in order to make the training process stable, for example, to make the training process converge stably, or to maintain precision of the neural network after training, an update condition needs to be set. Herein the indicator parameter may be various parameters such as a parameter of the batch normalization layer and times of training of the first neural network, which is further described in detail below.

In step S130, an update manner corresponding to a preset condition is determined if the indicator parameter meets the preset condition. In other words, if it is determined that the first neural network meets the update condition by determining that the indicator parameter meets the preset condition, the parameter of the batch normalization layer in the first neural network is updated, to increase a quantity of zero elements in the output feature map, thereby implementing sparsing of the feature map.

Figure 2:
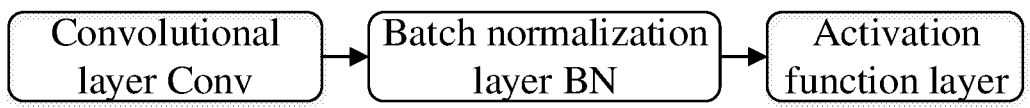
FIG. 2 is a structural block diagram of a typical convolutional neural network.

FIG. 2 is a structural block diagram of a typical convolutional neural network. As shown in FIG. 2, a typical convolutional neural network includes a batch normalization layer BN after a convolutional layer Conv. Herein the BN layer is used to reduce input space, to reduce difficulty of adjusting a parameter; and prevent gradient explosion/disappearance, to accelerate network convergence. For example, in the BN layer, mean and variance of batch data are first calculated, then the batch data is normalized and finally multiplies by a scaling matrix and adds a translation vector. Further, after the BN layer, an activation function layer is included, to obtain a feature map output by the convolutional neural network.

In an example in which an activation function is an ReLU activation function, sparsing of the feature map is equivalent to reducing a quantity of zero elements output after the ReLU layer, that is, increasing the quantity of zero elements. As mentioned above, a computation process of the BN layer is as follows:

$$BN(x) = \alpha\left(\frac{x-e}{\delta}\right) + \beta$$

where e denotes a mean value, $\delta$ denotes a standard deviation, $\alpha$ is a scaling parameter, and $\beta$ is a translation parameter. The two parameters are introduced to guarantee the nonlinearity of BN. Operations of scale($\alpha$) and shift($\beta$) are performed on transformed x having a mean of 0 and a variance of 1, that is, y=scale($\alpha$)*x+shift($\beta$).

Therefore, two parameters $\alpha$ and $\beta$ are added to a feature map calculated by each feature layer of the neural network. The two parameters are learned by training. Each feature value on the feature map can be shifted leftwards or rightwards from standard normal distribution by using scale($\alpha$) and shift($\beta$) and scaled, and a degree of shift of the feature value on each feature map is different, which is equivalent to that a value of a nonlinear function is shifted from a linear region around a true center to a nonlinear region.

In addition, a computation process of the ReLU layer is as follows:

ReLU(x)=max(0,x)

In order to increase a quantity of zero elements in a computation result of the ReLU layer, a quantity of elements that are less than 0 and that are input into the ReLU layer needs to be increased, in other words, a quantity of elements that are less than 0 and that are in data output from the BN layer needs to be increased. Therefore, in the convolutional neural network shown in FIG. 2, an update manner, corresponding to the preset condition, determined according to the neural network training method in this embodiment of the present application is to update the parameter of the batch normalization layer, to increase a quantity of elements that are less than 0 and that are in data output from the batch normalization layer.

Certainly, a person skilled in the art may understand that, depending on a specific structure of the neural network, for example, a type of an activation function in an activation function layer following the BN layer, and a quantity and type of layers between the BN layer and an ultimately output feature map, for example, another layer, such as a fully connected layer, other than the activation function layer that is further included, the update manner corresponding to the preset condition may be another update manner of the parameter of the batch normalization layer, for example, increasing a quantity of elements that are greater than or equal to 0 and that are in the data output from the batch normalization layer, or making the elements meet other conditions.

In step S140, the parameter of the batch normalization layer in the first neural network is updated based on the update manner. To be specific, the parameter of the batch normalization layer in the first neural network is updated in the foregoing determined update manner, so that a quantity of zero elements in the ultimately output feature map can be increased, thereby implementing sparsing of the feature map output by the neural network.

The sparsing of the feature map can increase a compression ratio of data in the first neural network, reduce the amount of data to be transmitted, and then reduce a delay of data transmission and a quantity of transmissions. Therefore, smaller on-chip storage can be used to reduce costs by reducing the amount of data to be transmitted. Furthermore, the computation speed of the chip can be greatly accelerated by reducing the delay of data transmission and the quantity of transmissions.

Figure 3:
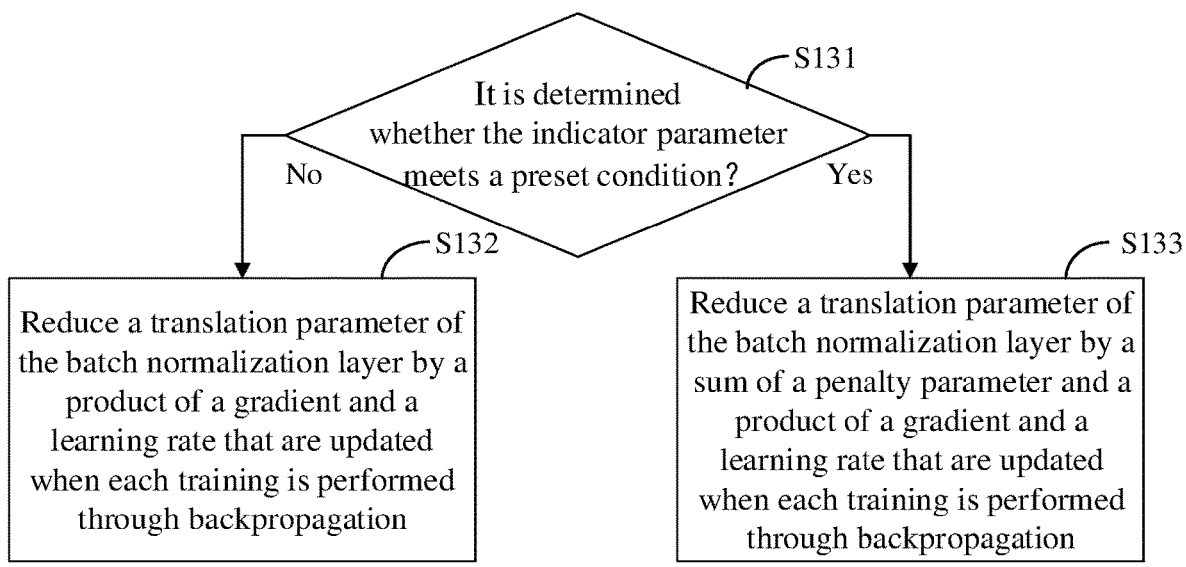
FIG. 3 is a flowchart of an example of an update manner of a neural network training method according to an embodiment of the present application.

FIG. 3 is a flowchart of an example of an update manner of a neural network training method according to an embodiment of the present application.

As shown in FIG. 3, based on the embodiment shown in FIG. 1, step S130 may include the following steps.

In step S131, it is determined whether the indicator parameter meets a preset condition, and preset conditions are different depending on specifically used indicator parameters, such as a parameter of a batch normalization layer, and times of training. For example, the parameter of the batch normalization layer is greater than a first predetermined threshold, or the times of training is greater than a second predetermined threshold.

In step S132, in response to that a determining result of step S131 is No, that is, the indicator parameter does not meet the preset condition, it is determined that the update manner is to reduce a translation parameter of the batch normalization layer by a product of a gradient and a learning rate that are updated when each training is performed through backpropagation, that is:

$$\beta=\beta-\eta\Delta\beta$$

where $\Delta\beta$ denotes a gradient updated when each training is performed through backpropagation, and $\eta$ denotes a learning rate updated when each training is performed through backpropagation.

In step S133, in response to that the determining result of step S131 is Yes, that is, the indicator parameter meets the preset condition, it is determined that the update manner is to reduce a translation parameter of the batch normalization layer by a sum of a penalty parameter and a product of a gradient and a learning rate that are updated when each training is performed through backpropagation, that is:

$$\beta=\beta-\eta\Delta\beta-\varepsilon$$

where $\varepsilon$ is a penalty parameter.

Therefore, the parameter of the batch normalization layer is updated in the foregoing update manner, so that an output of the batch normalization layer can be less than 0 with a greater probability by gradually penalizing a translation value in the batch normalization layer in the training process of the first neural network, thereby implementing sparsing of the feature map.

Herein the manner in which the translation parameter of the batch normalization layer is reduced by the penalty parameter can simply and effectively enable the output of the batch normalization layer to be less than 0, and enables the training process to be in low costs and high efficiency.

Figure 4:
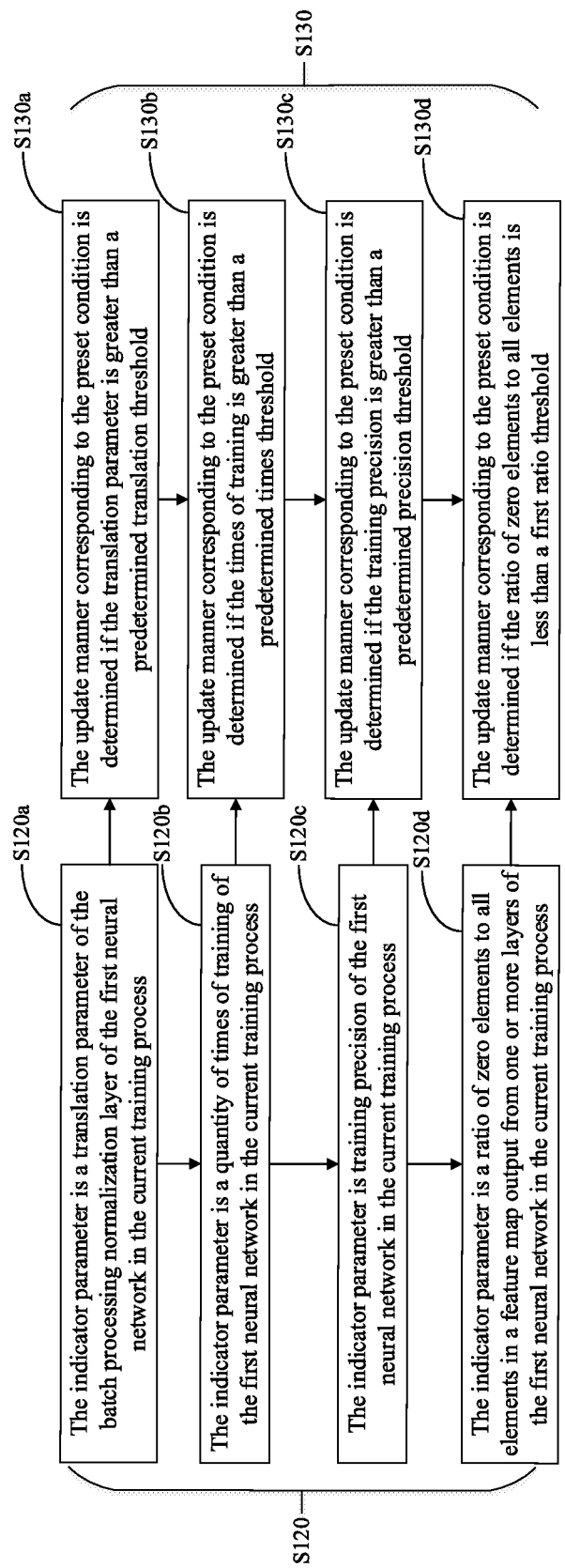
FIG. 4 is a schematic diagram of determining a preset condition in a neural network training method according to an embodiment of the present application.

FIG. 4 is a schematic diagram of determining a preset condition in a neural network training method according to an embodiment of the present application.

As shown in FIG. 4, based on the embodiment shown in FIG. 1, depending on the different indicator parameters, step S120 may include the following steps. In addition, correspondingly, different indicator parameters correspond to different preset condition determining manners, that is, step S130 may include the following steps.

In step S120a, the indicator parameter is a translation parameter of the batch processing normalization layer of the first neural network in the current training process. Unlimited penalties lead to excessive quantity of elements that are less than 0 and that are in data output from the BN layer, resulting in insufficient expression capability of a neural network. Ultimately, a high-precision neural network cannot be obtained. Therefore, a lower limit of the translation parameter, namely, an upper penalty limit, is set in this embodiment of the present application. For example, if $\beta > -1$, penalty is imposed; otherwise, if $\beta <= -1$, a conventional parameter update is performed, for example, reducing a translation parameter of the batch normalization layer by a product of a gradient and a learning rate that are updated when each training is performed through backpropagation.

Correspondingly, in step S130a, the update manner corresponding to the preset condition is determined if the translation parameter is greater than a predetermined translation threshold. For example, as described above, the translation parameter of the batch normalization layer is reduced by the sum of the penalty parameter and the product of the gradient and the learning rate that are updated when each training is performed through backpropagation. In this way, it can be ensured that the quantity of elements that are less than 0 and that are in the data output from the BN layer is not excessive, and the sufficient expression capability of the neural network can be guaranteed, thereby obtaining the high-precision neural network.

In step S120b, the indicator parameter is a quantity of times of training of the first neural network in the current training process. In the training process of a neural network, a convergence process of training may be unstable at the beginning of training. Therefore, a lower limit of the times of training, namely, a penalty start condition, is set in this embodiment of the present application. For example, a penalty may start after N iteration cycles of training are completed, that is, a penalty starts after N iterations of all sample data. Otherwise, in the foregoing training process, a conventional parameter update is performed, for example, reducing the translation parameter of the batch normalization layer by the product of the gradient and the learning rate that are updated when each training is performed through backpropagation.

Correspondingly, in step S130b, the update manner corresponding to the preset condition is determined if the times of training is greater than a predetermined times threshold. For example, as described above, the translation parameter of the batch normalization layer is reduced by the sum of the penalty parameter and the product of the gradient and the learning rate that are updated when each training is performed through backpropagation. In this way, the convergence process of training can be ensured to be stable.

In step S120c, the indicator parameter is training precision of the first neural network in the current training process. The description herein is the same as that described above. In the training process of a neural network, a convergence process of training may be unstable at the beginning of training. Therefore, a lower limit of the training precision, namely, a penalty start condition, is set in this embodiment of the present application. For example, a penalty may start after the training precision in the training process reaches a certain standard. Otherwise, in the foregoing training process, a conventional parameter update is performed, for example, reducing the translation parameter of the batch normalization layer by the product of the gradient and the learning rate that are updated when each training is performed through backpropagation.

Correspondingly, in step S130c, the update manner corresponding to the preset condition is determined if the training precision is greater than a predetermined precision threshold. For example, as described above, the translation parameter of the batch normalization layer is reduced by the sum of the penalty parameter and the product of the gradient and the learning rate that are updated when each training is performed through backpropagation. In this way, the convergence process of training can be ensured to be stable.

In step S120d, the indicator parameter is a ratio of zero elements to all elements in a feature map output from one or more layers of the first neural network in the current training process. Excessive quantity of zero elements in the feature map leads to insufficient neural network expression capability and ultimately a high-precision neural network cannot be obtained. Therefore, an upper limit of the ratio of zero elements to all elements in the feature map, namely, a penalty target, is set in this embodiment of the present application. For example, if a proportion of zero elements to all elements is less than 90%, that is, if a proportion of non-zero elements to all elements is greater than 10%, penalty is performed; otherwise, if the proportion of zero elements to all elements is greater than 90%, a conventional parameter update is performed, for example, reducing the translation parameter of the batch normalization layer by the product of the gradient and the learning rate that are updated when each training is performed through backpropagation.

Correspondingly, in step S130d, the update manner corresponding to the preset condition is determined if the ratio of zero elements to all elements is less than a first ratio threshold. For example, as described above, the translation parameter of the batch normalization layer is reduced by the sum of the penalty parameter and the product of the gradient and the learning rate that are updated when each training is performed through backpropagation. In this way, it can be ensured that the quantity of zero elements in the output feature map is not excessive, and the sufficient expression capability of the neural network can be guaranteed, thereby obtaining the high-precision neural network.

Herein, a person skilled in the art may understand that in steps S120a and 130a, the precision of the neural network is ensured by limiting the quantity of elements that are less than 0 and that are output from the BN layer, while in steps S120d and 130d, the precision of the neural network is ensured by limiting the ratio of zero elements to all elements in the ultimately output feature map, which is more direct than that in steps S120a and 130a.

In addition, as shown in FIG. 4, step S120 includes steps S120a to S120d. However, a person skilled in the art may understand that step S120 may include one or more of steps S120a to S120d, that is, any combination of the four indicator parameters and preset conditions thereof may be selected, and accordingly, step S130 also includes one or more of steps S130a to S130d.

In addition, the penalty targets in steps S120d and 130d are set in a simplest manner, that is, use a single penalty target, for example, a ratio of 90% of the output zero elements to all elements. However, this manner is relatively radical, which makes the training process difficult to control. Therefore, in this embodiment of the present application, another penalty target setting manner may be used. Specifically, in the penalty target setting manner, the target sparsity at each parameter update is related to a specific training process. For example, as a quantity of iterations increases, the penalty target is gradually increased from initial sparsity to a final penalty target. Training instability caused when the penalty target is set too high once can be prevented in the penalty target setting manner.

In addition, penalty targets can be set in stages according to the training process. For example, the penalty target is updated once every n iteration cycles, so that the neural network can correct degradation of network performance due to penalty. Certainly, the foregoing two manners may also be combined, or another condition is used, for example, training precision is used to determine whether to increase the penalty target.

Therefore, in the neural network training method according to this embodiment of the present application described above, the determining an update manner corresponding to a preset condition if the indicator parameter meets the preset condition includes: determining whether the ratio of zero elements to all elements is less than a second ratio threshold if the ratio of zero elements to all elements is greater than the first ratio threshold, where the second ratio threshold is greater than the first ratio threshold; and determining the update manner corresponding to the preset condition if the ratio of zero elements to all elements is less than the second ratio threshold.

Figure 5:
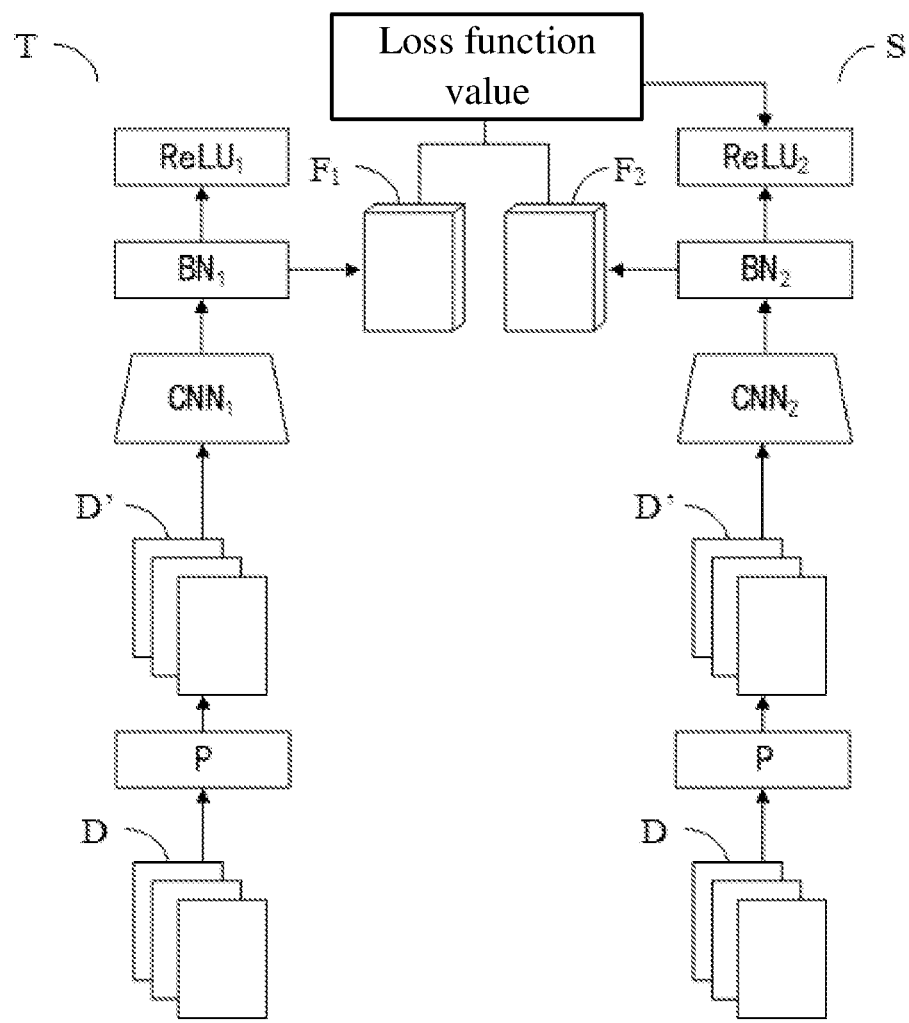
FIG. 5 is a schematic diagram of an example of supervised training in a neural network training method according to an embodiment of the present application.

FIG. 5 is a schematic diagram of an example of supervised training in a neural network training method according to an embodiment of the present application.

In a specific training process of the neural network training method according to this embodiment of the present application, performance (such as accuracy) of a neural network may be slightly reduced due to improper setting of some conditions. In this respect, the performance of the neural network can be improved in various manners of knowledge distillation.

As shown in FIG. 5, a trained second neural network T is used to supervise training of a first neural network S, where T and S may be a same neural network. For example, T has a convolutional layer $CNN_1$, a BN layer $BN_1$ and a ReLU activation function layer $ReLU_1$. Furthermore, S has a convolutional layer $CNN_2$, a BN layer $BN_2$ and a ReLU activation function layer $ReLU_2$. Sample data, for example, an image set D, is preprocessed through a preprocessing process P to obtain D', and D' is input to the $CNN_1$ of the second neural network T and the $CNN_2$ of the first neural network S.

In order to supervise the training of the first neural network S by using the second neural network T, a first feature map $F_1$ is obtained from a predetermined layer of the first neural network S, for example, the BN layer BN1 shown in FIG. 5, and a second feature map $F_2$ is obtained from a corresponding predetermined layer of the second neural network T, for example, the BN layer $BN_2$ shown in FIG. 5. In addition, a computational process of the BN layer BN1 and that of the BN layer $BN_2$ need to be the same. Herein, the first feature map and the second feature map may alternatively be obtained from another layer of the first neural network S and another layer of the second neural network T respectively, such as a ReLU activation function layer or a layer in a convolutional layer, provided that the another layer is a corresponding predetermined layer in each of the first neural network S and the second neural network T.

Then a loss function value, such as a cross-entropy loss function value, between the first feature map $F_1$ and the second feature map $F_2$ is calculated, and the loss function value is used to train the first neural network S in a manner such as backpropagation, to update a parameter of the first neural network S. Then an updated indicator parameter, such as a translation parameter of the BN layer, of the first neural network is determined.

In addition, after the training of the first neural network S is completed, the updated first neural network S may be used as an initial first neural network S, and the second neural network T continues to be used to train the first neural network S, thereby further improving precision of the trained first neural network S in an iterative training manner.

That is, in the neural network training method according to this embodiment of the present application, the determining an indicator parameter of the first neural network in a current training process includes: outputting a first feature map of the sample data through a predetermined layer of the first neural network in the current training process; outputting a second feature map of the sample data through a corresponding predetermined layer of a trained second neural network; and determining an indicator parameter of the first neural network in the current training process based on a loss function value between the first feature map and the second feature map.

In this way, the trained second neural network is used to supervise the training of the first neural network, so that performance, such as accuracy, of the first neural network can be improved.

Exemplary Apparatuses

Figure 6:
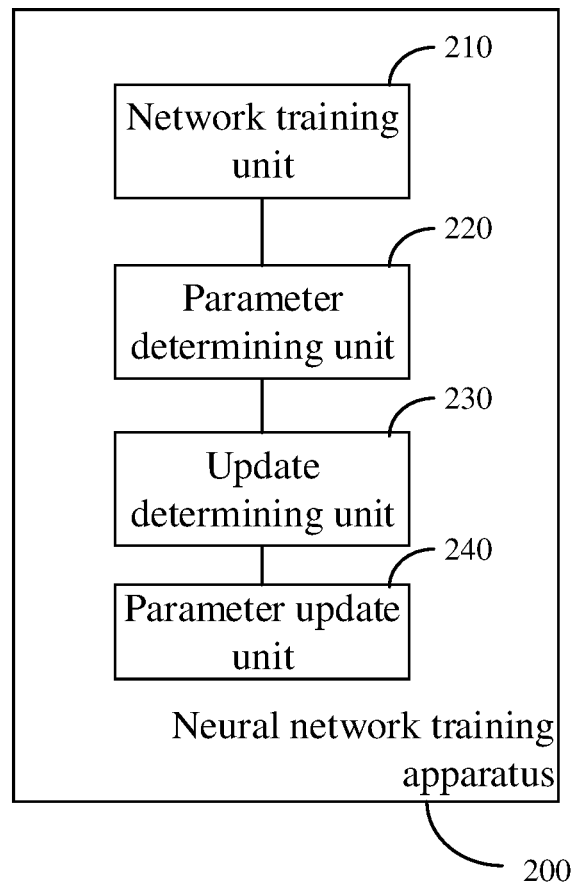
FIG. 6 is a block diagram of a neural network training apparatus according to an embodiment of the present application.

FIG. 6 is a block diagram of a neural network training apparatus according to an embodiment of the present application.

As shown in FIG. 6, a neural network training apparatus 200 according to an embodiment of the present application includes: a network training unit 210, configured to train a first neural network to be trained by using sample data; a parameter determining unit 220, configured to determine an indicator parameter of the first neural network, in a current training process, trained by the network training unit 210; an update determining unit 230, configured to determine an update manner corresponding to a preset condition if the indicator parameter determined by the parameter determining unit 220 meets the preset condition; and a parameter update unit 240, configured to update a parameter of a batch normalization layer in the first neural network based on the update manner determined by the update determining unit 230.

Figure 7:
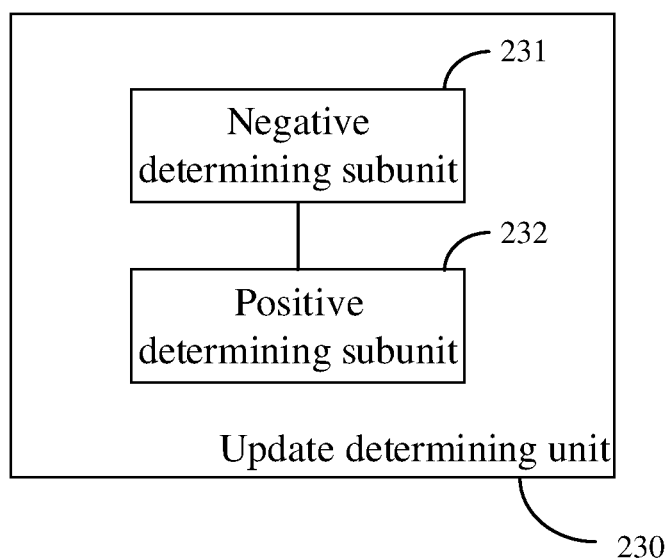
FIG. 7 is a block diagram of a first example of an update determining unit in a neural network training apparatus according to an embodiment of the present application.

FIG. 7 is a block diagram of a first example of an update determining unit in a neural network training apparatus according to an embodiment of the present application.

As shown in FIG. 7, on the basis of the embodiment shown in FIG. 6, the update determining unit 230 includes: a negative determining subunit 231, configured to: if the indicator parameter determined by the parameter determining unit 220 does not meet the preset condition, determine that the update manner is to reduce a translation parameter of the batch normalization layer by a product of a gradient and a learning rate that are updated when each training is performed through backpropagation; and a positive determining subunit 232, configured to: if the indicator parameter determined by the parameter determining unit 220 meets the preset condition, determine that the update manner is to reduce a translation parameter of the batch normalization layer by a sum of a penalty parameter and a product of a gradient and a learning rate that are updated when each training is performed through backpropagation.

FIG. 8(a) to FIG. 8(d) are block diagrams of a second example of a parameter determining unit and an update determining unit in a neural network training apparatus according to an embodiment of the present application.

Figure 8A:
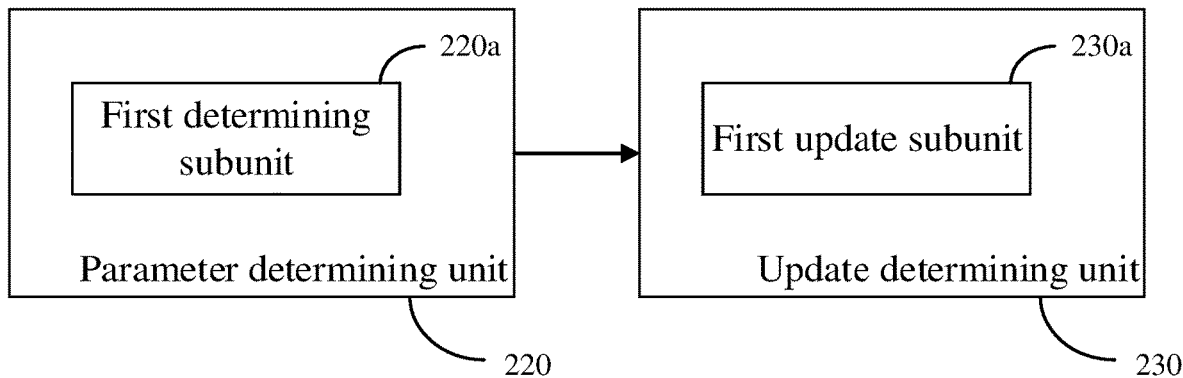
FIG. 8(*a*) to FIG. 8(*d*) are block diagrams of a second example of a parameter determining unit and an update determining unit in a neural network training apparatus according to an embodiment of the present application.
Figure 8:
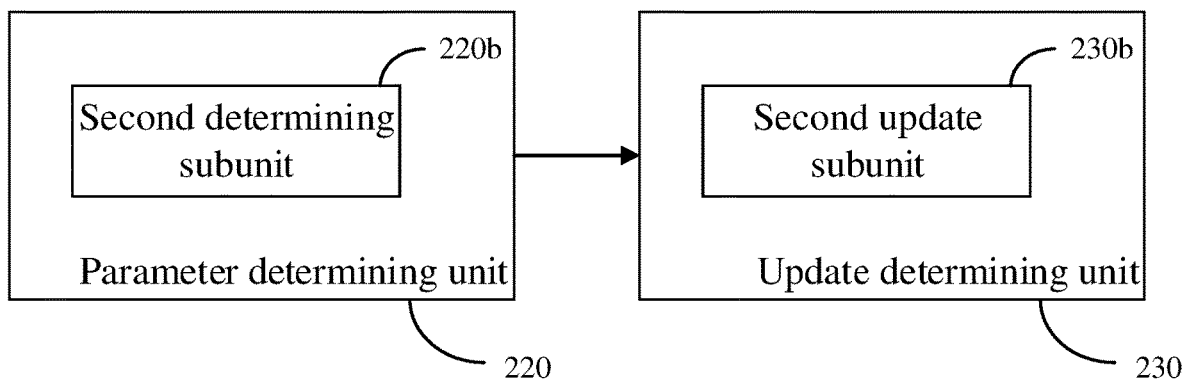
Figure 8:
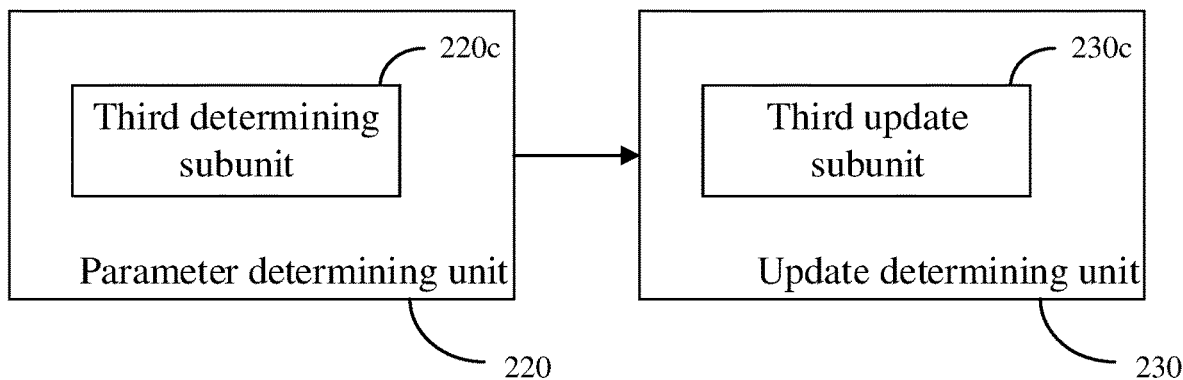
Figure 8:
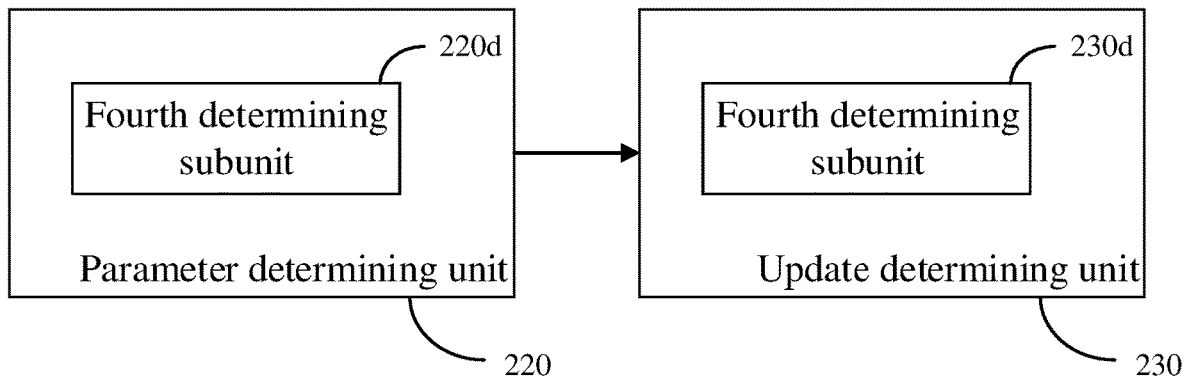

As shown in FIG. 8(a), on the basis of the embodiment shown in FIG. 6, the parameter determining unit 220 includes: a first determining subunit 220a, configured to determine a translation parameter of the batch normalization layer of the first neural network, in the current training process, trained by the network training unit 210; and the update determining unit 230 includes: a first update subunit 230a, configured to determine the update manner corresponding to the preset condition if the first determining subunit 220a determines that the translation parameter is greater than a predetermined translation threshold.

As shown in FIG. 8(b), on the basis of the embodiment shown in FIG. 6, the parameter determining unit 220 includes: a second determining subunit 220b, configured to determine times of training of the first neural network, in the current training process, trained by the network training unit 210; and the update determining unit 230 includes: a second update subunit 230b, configured to determine the update manner corresponding to the preset condition if the second determining subunit 220b determines that the times of training is greater than a predetermined times threshold.

As shown in FIG. 8(c), on the basis of the embodiment shown in FIG. 6, the parameter determining unit 220 includes: a third determining subunit 220c, configured to determine training precision of the first neural network, in the current training process, trained by the network training unit 210; and the update determining unit 230 includes: a third update subunit 230c, configured to determine the update manner corresponding to the preset condition if the third determining subunit 220c determines that the training precision is greater than a predetermined precision threshold.

As shown in FIG. 8(d), on the basis of the embodiment shown in FIG. 6, the parameter determining unit 220 includes: a fourth determining subunit 220d, configured to determine a ratio of zero elements to all elements in a feature map output from one or more layers of the first neural network, in the current training process, trained by the network training unit 210; and the update determining unit 230 includes: a fourth update subunit 230d, configured to determine the update manner corresponding to the preset condition if the fourth determining subunit 220d determines that the ratio of zero elements to all elements is less than a first ratio threshold.

Herein, a person skilled in the art may understand that the description herein is the same as that described above. The parameter determining unit 220 according to this embodiment of the present application may include one or more of the first determining subunit 220a to the fourth determining subunit 220d, and correspondingly, the update determining unit 230 according to this embodiment of the present application may also include one or more of the first update subunit 230a to the fourth update subunit 230d.

Figure 9:
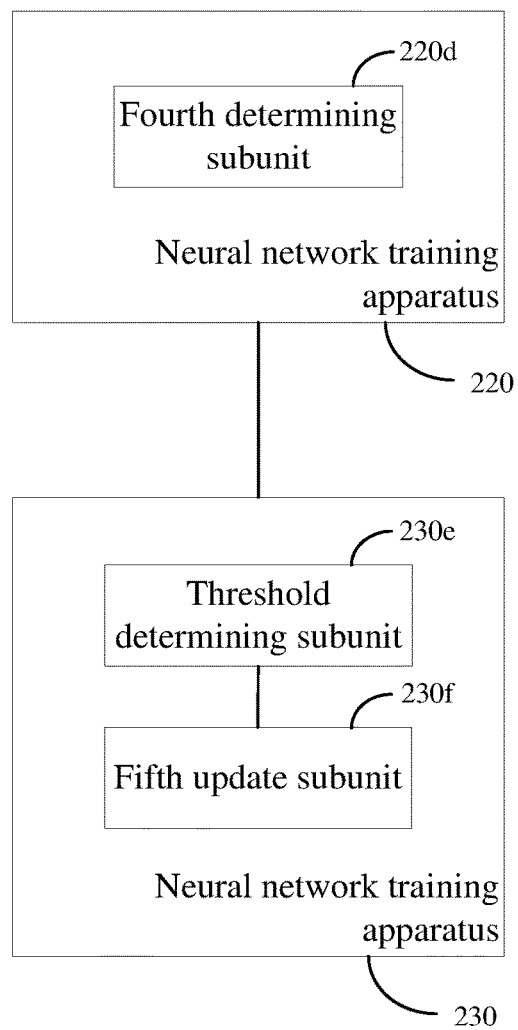
FIG. 9 is a block diagram of a third example of an update determining unit in a neural network training apparatus according to an embodiment of the present application.

FIG. 9 is a block diagram of a third example of an update determining unit in a neural network training apparatus according to an embodiment of the present application.

As shown in FIG. 9, on the basis of the embodiment shown in FIG. 8(d), the update determining unit 230 further includes: a threshold determining subunit 230e, configured to determine whether the ratio of zero elements to all elements is less than a second ratio threshold if the fourth determining subunit 230d determines that the ratio of zero elements to all elements is greater than the first ratio threshold, where the second ratio threshold is greater than the first ratio threshold; and a fifth update subunit 230f, configured to determine the update manner corresponding to the preset condition if the threshold determining subunit 230e determines that the ratio of zero elements to all elements is less than the second ratio threshold.

Figure 10:
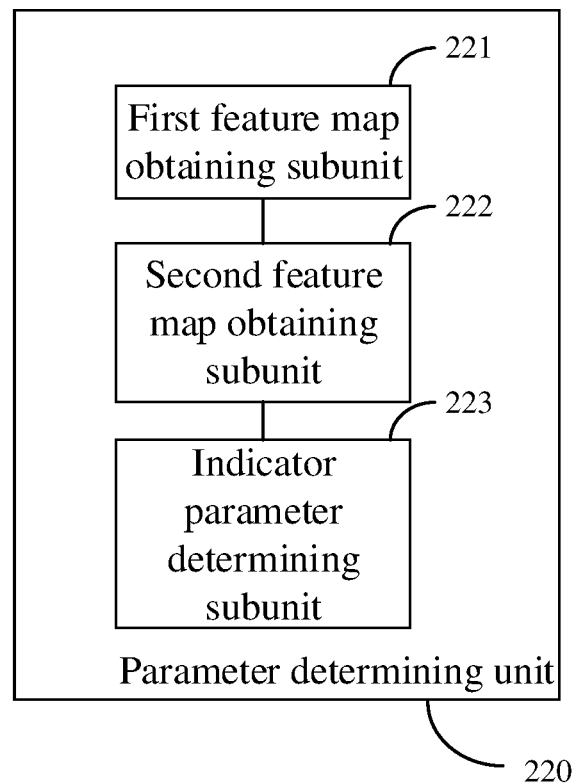
FIG. 10 is a block diagram of an example of a parameter determining unit in a neural network training apparatus according to an embodiment of the present application.

FIG. 10 is a block diagram of an example of a parameter determining unit in a neural network training apparatus according to an embodiment of the present application.

As shown in FIG. 10, on the basis of the embodiment shown in FIG. 6, the parameter determining unit 220 includes: a first feature map obtaining subunit 221, configured to output a first feature map of the sample data through a predetermined layer of the first neural network, in the current training process, trained by the network training unit 210; a second feature map obtaining subunit 222, configured to output a second feature map of the sample data through a corresponding predetermined layer of a trained second neural network; and an indicator parameter determining subunit 223, configured to determine an indicator parameter of the first neural network in the current training process based on a loss function value between the first feature map obtained by the first feature map obtaining subunit 221 and the second feature map obtained by the second feature map obtaining subunit 222.

Herein, a person skilled in the art may understand that specific functions and operations of units and modules in the neural network training apparatus 200 have been described in detail in the foregoing descriptions of the neural network training methods with reference to FIG. 1 to FIG. 5, and therefore, repeated descriptions thereof are omitted herein.

As described above, the neural network training apparatus 200 according to this embodiment of the present application may be implemented in various terminal devices, such as a server used for object detection and object classification in a self-driving scenario. In an example, the neural network training apparatus 200 according to this embodiment of the present application may be integrated into a terminal device as a software module and/or a hardware module. For example, the neural network training apparatus 200 may be a software module in an operating system of the terminal device, or may be an application program developed for the terminal device. Certainly, the neural network training apparatus 200 may also be one of a plurality of hardware modules of the terminal device.

Alternatively, in another example, the neural network training apparatus 200 and the terminal device may also be separate devices, and the neural network training apparatus 200 may be connected to the terminal device via a wired and/or wireless network and transmit interactive information in an agreed data format.

Exemplary Electronic Devices

Figure 11:
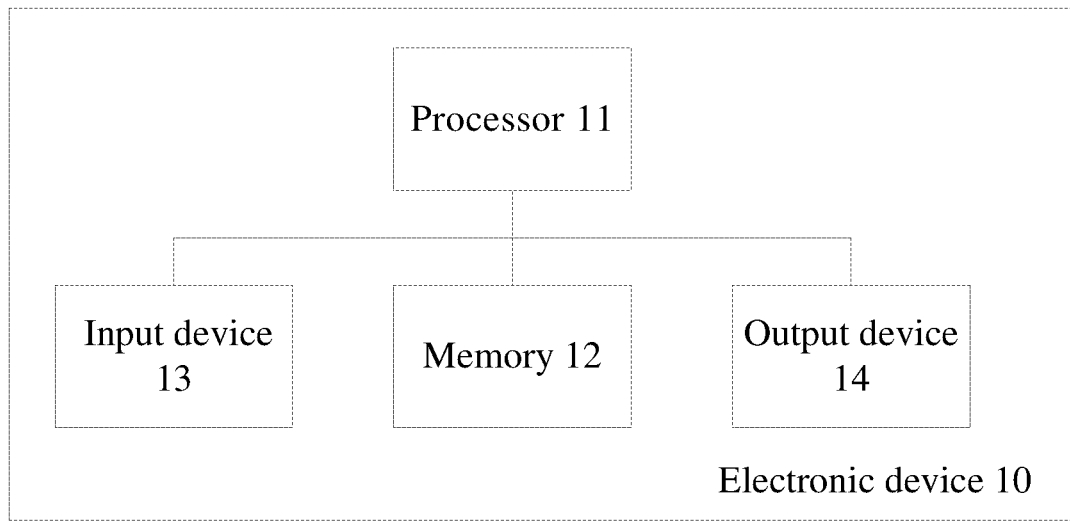
FIG. 11 is a block diagram of an electronic device according to an embodiment of the present application.

The following describes an electronic device according to an embodiment of the present application with reference to FIG. 11.

FIG. 11 is a block diagram of an electronic device according to an embodiment of the present application.

As shown in FIG. 11, an electronic device 10 includes one or more processors 11 and a memory 12.

The processor 11 may be a central processing unit (CPU) or another form of processing unit with data processing capability and/or instruction execution capability, and may control another component in the electronic device 10 to perform an expected function.

The memory 12 may include one or more computer program products, which may include various forms of computer-readable storage media, such as a volatile memory and/or non-volatile memory. The volatile memory may include, for example, a random access memory (RAM) and/or a cache (cache). The non-volatile memory may include, for example, a read-only memory (ROM), a hard disk, and a flash memory. The compute-readable storage media may store one or more computer program instructions, and the processor 11 may run the program instructions to implement the neural network training method and/or other expected functions of the embodiments in the present application described above. The compute-readable storage media may further store various types of content such as an indicator parameter, a preset condition, and an update manner.

In an example, the electronic device 10 may further include an input device 13 and an output device 14, and these components are interconnected by using a bus system and/or another form of connection mechanism (not shown).

The input device 13 may include, for example, a keyboard, and a mouse.

The output device 14 may output various types of information to the outside, including a trained first neural network and the like. The output device 14 may include, for example, a display, a speaker, a printer, a communications network, and a remote output device connected to the communications network.

Certainly, for simplicity, only some of the components related to the present application in the electronic device 10 are shown in FIG. 11, and components such as a bus, and an input/output interface are omitted. In addition, the electronic device 10 may further include any other suitable component depending on a specific application case.

Exemplary Computer Program Products and Computer-Readable Storage Media

In addition to the foregoing methods and devices, an embodiment of the present application may also be a computer program product that includes computer program instructions. When the computer program instructions are run by a processor, the processor is enabled to perform the steps of the neural network training method according to the embodiments of the present application described in the "exemplary method" part of this specification.

The computer program product may write program code for performing the operations of the embodiments of the present application in any combination of one or more programming languages, and the programming languages include object-oriented programming languages such as Java and C++, and further include conventional procedural programming languages such as "C" or similar programming languages. The program code may be executed entirely on a user computing device, partly on a user device, as a stand-alone software package, partly on a user computing device while partly on a remote computing device, or entirely on a remote computing device or a server.

In addition, an embodiment of the present application may also be a computer-readable storage media, where the computer-readable storage media stores computer program instructions. When the computer program instructions are run by a processor, the processor is enabled to perform the steps of the neural network training method according to the embodiments of the present application described in the "exemplary method" part of this specification.

The computer-readable storage media may use any combination of one or more readable media. The readable media may be a readable signal media or a readable storage media. The readable storage media may include, for example, but not limited to, an electronic, magnetic, optical, electromagnetic, infrared, or semiconductor system, apparatus, or means, or any combination of the above. More specific examples (a non-exhaustive list) of the readable storage media include: an electrical connection having one or more wires, a portable computer disk, a hard disk, a random access memory (RAM), a read-only memory (ROM), an erasable programmable read-only memory (EPROM or a flash memory), an optical fiber, a portable compact disk read-only memory (CD-ROM), an optical storage means, a magnetic storage means, or any suitable combination of the above.

The foregoing describes basic principles of the present application with reference to specific embodiments. However, it should be noted that the benefits, advantages, effects, and the like mentioned in the present application are merely examples but not limitations, and cannot be considered that these benefits, advantages, effects, and the like are essential to the embodiments of the present application. In addition, the specific details disclosed above are intended only for the purpose of illustration and convenience of understanding, and are not limited thereto, and are not intended to limit the present application to the specific details described above.

The block diagrams of components, apparatuses, devices and systems in the present application are merely illustrative examples and are not intended to require or imply that connections, arrangements and configurations must be performed in the manner shown in the block diagrams. As will be recognized by those skilled in the art, these components, apparatuses, devices and systems can be connected, arranged and configured in any manner. Terms such as "comprise", "include", "have" are open words, meaning "include but not limited to", and they can be used interchangeably. Terms "or" and "and" used herein refer to "and/or", and they can be used interchangeably unless the context expressly indicates otherwise. Term "such as" used herein refers to "such as but not limited to" and they can be used interchangeably.

It should also be noted that, in the apparatuses, devices and methods of the present application, components or steps can be decomposed and/or recombined. These decomposition and/or recombination shall be considered as equivalent solutions of the present application.

The foregoing descriptions of the disclosed aspects are provided to enable any person skilled in the art to make or use the present application. Modifications to these aspects are very obvious to those skilled in the art and the general principles defined herein can be applied to other aspects without departing from the scope of the present application. Therefore, the present application is not intended to be limited to the aspects shown herein, but is to be accorded the broadest scope consistent with the principles and novel features disclosed herein.

What is claimed is:

1. A neural network training method, comprising:
   training a first neural network to be trained by using sample image data, wherein the sample image data comprises an image set collected in a self-driving scenario, the first neural network is used to identify a target in an image collected in a self-driving scenario, and the first neural network comprises a convolutional layer, a batch normalization layer and an activation function layer;

determining an indicator parameter of the first neural network in a current training process, wherein the indicator parameter comprises at least one of a translation parameter of the batch normalization layer, times of training of the first neural network in the current training process, a training precision of the first neural network in the current training process and a ratio of zero elements to all elements in a feature map output from one or more layers of the first neural network in the current training process;

determining an update manner corresponding to a preset condition when the indicator parameter meets the preset condition, wherein the preset condition is configured to indicate whether the indicator parameter meets a threshold requirement; and updating a parameter of the batch normalization layer based on the update manner, wherein the update manner is configured to increase a quantity of zero elements in a feature map output by the activation function layer, so as to reduce an amount of data to be transmitted between a storage unit and at least one of a multiplier and an accumulator in a chip, the chip is used to perform computer instructions of the first neural network, the feature map output by the activation function layer comprises a plurality of elements, and the plurality of elements comprises the zero elements and non-zero elements.

2. The neural network training method of claim 1, wherein the determining an update manner corresponding to a preset condition when the indicator parameter meets the preset condition comprises:

when the indicator parameter meets the preset condition, determining that the update manner is to reduce the translation parameter of the batch normalization layer by a sum of a penalty parameter and a product of a gradient and a learning rate that are updated when each training is performed through backpropagation.

3. The neural network training method of claim 2, wherein the determining an update manner corresponding to a preset condition when the indicator parameter meets the preset condition further comprises:

when the indicator parameter does not meet the preset condition, determining that the update manner is to reduce the translation parameter of the batch normalization layer by a product of a gradient and a learning rate that are updated when each training is performed through backpropagation.

4. The neural network training method of claim 1, wherein the determining an indicator parameter of the first neural network in a current training process comprises:

determining the translation parameter of the batch normalization layer of the first neural network in the current training process, wherein the determining an update manner corresponding to a preset condition when the indicator parameter meets the preset condition comprises:

determining the update manner corresponding to the preset condition when the translation parameter is greater than a predetermined translation threshold.

5. The neural network training method of claim 1, wherein the determining an indicator parameter of the first neural network in a current training process comprises:

determining the times of training of the first neural network in the current training process, wherein the determining an update manner corresponding to a preset condition when the indicator parameter meets the preset condition comprises:

determining the update manner corresponding to the preset condition when the times of training is greater than a predetermined times threshold.

6. The neural network training method of claim 1, wherein the determining an indicator parameter of the first neural network in a current training process comprises:

determining the training precision of the first neural network in the current training process, wherein the determining an update manner corresponding to a preset condition when the indicator parameter meets the preset condition comprises:

determining the update manner corresponding to the preset condition when the training precision is greater than a predetermined precision threshold.

7. The neural network training method of claim 1, wherein the determining an indicator parameter of the first neural network in a current training process comprises:

determining the ratio of zero elements to all elements in a feature map output from one or more layers of the first neural network in the current training process, wherein the determining an update manner corresponding to a preset condition when the indicator parameter meets the preset condition comprises:

determining the update manner corresponding to the preset condition when the ratio of zero elements to all elements is less than a first ratio threshold.

8. The neural network training method of claim 7, wherein the determining an update manner corresponding to a preset condition when the indicator parameter meets the preset condition comprises:

determining whether the ratio of zero elements to all elements is less than a second ratio threshold when the ratio of zero elements to all elements is greater than the first ratio threshold, wherein the second ratio threshold is greater than the first ratio threshold; and determining the update manner corresponding to the preset condition when the ratio of zero elements to all elements is less than the second ratio threshold.

9. The neural network training method of claim 7, wherein the first ratio threshold is updated as a number of iterations increases.

10. The neural network training method of claim 1, wherein the determining an indicator parameter of the first neural network in a current training process comprises:

outputting a first feature map of the sample image data through a predetermined layer of the first neural network in the current training process;

outputting a second feature map of the sample image data through a corresponding predetermined layer of a trained second neural network; and determining the indicator parameter of the first neural network in the current training process based on a loss function value between the first feature map and the second feature map.

11. A neural network training apparatus, comprising:

a processor; and a memory on which a computer program instruction is stored, wherein when the computer program instruction is executed by the processor, the processor performs the following steps:

training a first neural network to be trained by using sample image data, wherein the sample image data comprises an image set collected in a self-driving scenario, the first neural network is used to identify a target in an image collected in a self-driving scenario, and the first neural network comprises a convolutional layer, a batch normalization layer and an activation function layer;

determining an indicator parameter of the first neural network in a current training process, wherein the indicator parameter comprises at least one of a translation parameter of the batch normalization layer, times of training of the first neural network in the current training process, a training precision of the first neural network in the current training process and a ratio of zero elements to all elements in a feature map output from one or more layers of the first neural network in the current training process;

determining an update manner corresponding to a preset condition when the indicator parameter meets the preset condition, wherein the preset condition is configured to indicate whether the indicator parameter meets a threshold requirement; and updating a parameter of the batch normalization layer based on the update manner, wherein the update manner is configured to increase a quantity of zero elements in a feature map output by the activation function layer, so as to reduce an amount of data to be transmitted between a storage unit and at least one of a multiplier and an accumulator in a chip, the chip is used to perform computer instructions of the first neural network, the feature map output by the activation function layer comprises a plurality of elements, and the plurality of elements comprises the zero elements and non-zero elements.

12. The neural network training apparatus of claim 11, wherein the determining an update manner corresponding to a preset condition when the indicator parameter meets the preset condition comprises:

when the indicator parameter meets the preset condition, determining that the update manner is to reduce the translation parameter of the batch normalization layer by a sum of a penalty parameter and a product of a gradient and a learning rate that are updated when each training is performed through backpropagation.

13. The neural network training apparatus of claim 12, wherein the determining an update manner corresponding to a preset condition when the indicator parameter meets the preset condition further comprises:

when the indicator parameter does not meet the preset condition, determining that the update manner is to reduce the translation parameter of the batch normalization layer by a product of a gradient and a learning rate that are updated when each training is performed through backpropagation.

14. The neural network training apparatus of claim 11, wherein the determining an indicator parameter of the first neural network in a current training process comprises:

determining the translation parameter of the batch normalization layer of the first neural network in the current training process;

wherein the determining an update manner corresponding to a preset condition when the indicator parameter meets the preset condition comprises:

determining the update manner corresponding to the preset condition when the translation parameter is greater than a predetermined translation threshold.

15. The neural network training apparatus of claim 11, wherein the determining an indicator parameter of the first neural network in a current training process comprises:

determining the times of training of the first neural network in the current training process;

wherein the determining an update manner corresponding to a preset condition when the indicator parameter meets the preset condition comprises:

determining the update manner corresponding to the preset condition when the times of training is greater than a predetermined times threshold.

16. The neural network training apparatus of claim 11, wherein the determining an indicator parameter of the first neural network in a current training process comprises:

determining the training precision of the first neural network in the current training process;

wherein the determining an update manner corresponding to a preset condition when the indicator parameter meets the preset condition comprises:

determining the update manner corresponding to the preset condition when the training precision is greater than a predetermined precision threshold.

17. The neural network training apparatus of claim 11, wherein the determining an indicator parameter of the first neural network in a current training process comprises:

determining the ratio of zero elements to all elements in a feature map output from one or more layers of the first neural network in the current training process;

wherein the determining an update manner corresponding to a preset condition when the indicator parameter meets the preset condition comprises:

determining the update manner corresponding to the preset condition when the ratio of zero elements to all elements is less than a first ratio threshold.

18. The neural network training apparatus of claim 17, wherein the determining an update manner corresponding to a preset condition when the indicator parameter meets the preset condition comprises:

determining whether the ratio of zero elements to all elements is less than a second ratio threshold when the ratio of zero elements to all elements is greater than the first ratio threshold, wherein the second ratio threshold is greater than the first ratio threshold; and determining the update manner corresponding to the preset condition when the ratio of zero elements to all elements is less than the second ratio threshold.

19. The neural network training apparatus of claim 11, wherein the determining an indicator parameter of the first neural network in a current training process comprises:

outputting a first feature map of the sample image data through a predetermined layer of the first neural network in the current training process;

outputting a second feature map of the sample image data through a corresponding predetermined layer of a trained second neural network; and determining the indicator parameter of the first neural network in the current training process based on a loss function value between the first feature map and the second feature map.

20. A non-transitory computer readable media on which a computer program instruction is stored, wherein when the computer program instruction is executed by a processor, the processor performs the following steps:

training a first neural network to be trained by using sample image data, wherein the sample image data comprises an image set collected in a self-driving scenario, the first neural network is used to identify a target in an image collected in a self-driving scenario, and the first neural network comprises a convolutional layer, a batch normalization layer and an activation function layer;

determining an indicator parameter of the first neural network in a current training process, wherein the indicator parameter comprises at least one of a translation parameter of the batch normalization layer, times of training of the first neural network in the current training process, a training precision of the first neural network in the current training process and a ratio of zero elements to all elements in a feature map output from one or more layers of the first neural network in the current training process;

determining an update manner corresponding to a preset condition when the indicator parameter meets the preset condition, wherein the preset condition is configured to indicate whether the indicator parameter meets a threshold requirement; and updating a parameter of the batch normalization layer based on the update manner, wherein the update manner is configured to increase a quantity of zero elements in a feature map output by the activation function layer, so as to reduce an amount of data to be transmitted between a storage unit and at least one of a multiplier and an accumulator in a chip, the chip is used to perform computer instructions of the first neural network, the feature map output by the activation function layer comprises a plurality of elements, and the plurality of elements comprises the zero elements and non-zero elements.

* * * * *